United States Patent
Stephens et al.

(10) Patent No.: US 11,966,932 B2
(45) Date of Patent: *Apr. 23, 2024

(54) PROVIDING WIRELESS NETWORK ACCESS

(71) Applicant: Comcast Cable Communications, LLC, Philadelphia, PA (US)

(72) Inventors: Billy Edison Stephens, West Chester, PA (US); Kam-Cheong Anthony Tsoi, San Diego, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,705

(22) Filed: Jan. 12, 2023

(65) Prior Publication Data
US 2023/0222521 A1 Jul. 13, 2023

Related U.S. Application Data

(63) Continuation of application No. 14/278,732, filed on May 15, 2014, now Pat. No. 11,605,097.

(51) Int. Cl.
| | |
|---|---|
| *G06Q 30/00* | (2023.01) |
| *G06Q 30/02* | (2023.01) |
| *G06Q 30/0251* | (2023.01) |
| *H04W 28/02* | (2009.01) |
| *H04W 74/00* | (2009.01) |
| *H04W 48/02* | (2009.01) |

(52) U.S. Cl.
CPC ........ *G06Q 30/02* (2013.01); *G06Q 30/0267* (2013.01); *H04W 28/0268* (2013.01); *H04W 74/002* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 5,774,869 A | * | 6/1998 | Toader ............... G06Q 20/28 705/14.34 |
| 5,996,007 A | | 11/1999 | Klug et al. |
| 6,057,872 A | | 5/2000 | Candelore |
| 8,955,006 B2 | | 2/2015 | Fang et al. |
| 2002/0078059 A1 | | 6/2002 | Urera |
| 2002/0103879 A1 | | 8/2002 | Mondragon |

(Continued)

FOREIGN PATENT DOCUMENTS

| | | |
|---|---|---|
| WO | 9927454 A2 | 6/1999 |
| WO | 0150369 A2 | 7/2001 |

OTHER PUBLICATIONS

Peter Sayer, "Startup Meraki to finish dropped SF Wi-Fi project", Jan. 22, 2008, Downsview, vol. 24, Issue 2 (Year: 2008).*

(Continued)

*Primary Examiner* — Naresh Vig
(74) *Attorney, Agent, or Firm* — Banner & Witcoff, Ltd.

(57) ABSTRACT

A network access point may control access by limiting time of access to users, and by granting additional access time in exchange for certain user behavior, such as viewing advertisements. Other rewards may be granted as well, such as changes to the user's network access quality, or access to restricted content.

30 Claims, 5 Drawing Sheets

(56) References Cited

U.S. PATENT DOCUMENTS

| | | | |
|---|---|---|---|
| 2002/0198957 A1* | 12/2002 | Amjadi | G06Q 30/04 709/217 |
| 2003/0177207 A1 | 9/2003 | Nagasaka et al. | |
| 2003/0191853 A1 | 10/2003 | Ono | |
| 2006/0053049 A1 | 3/2006 | Nolan | |
| 2007/0288951 A1 | 12/2007 | Ray et al. | |
| 2008/0134228 A1 | 6/2008 | Dion et al. | |
| 2009/0048915 A1 | 2/2009 | Chan | |
| 2011/0302033 A1* | 12/2011 | Lee | G06Q 30/0259 705/14.57 |
| 2014/0052535 A1 | 2/2014 | Jung et al. | |
| 2015/0163560 A1 | 6/2015 | Holley et al. | |

OTHER PUBLICATIONS

Docter et al., "The Telecom Industry and Context Awareness", 2007, Sixth International Conference on the Management of Mobile Business (ICMB 2007) (Year: 2007).*

Watch Hulu Shows With Only One Commercial, Kevin Purdy, dated Feb. 23, 2009. Webpage: http://lifehacker.com/5158623/watch-hulu-shows-with-only-one-commercial.

HitBliss : How it Works; webpage: http://www.hitbliss.com/howitworks.html[Aug. 12, 2014 1:25:08 PM], date unknown but believed to be before May 15, 2014.

"Revolutionizing the Online Payment Landscape: Why We Created HitBliss", Melanie Long, dated Jul. 11, 2013. Webpage: http://www.hitbliss.com/blog/revolutionizing-the-online-payment-landscape-why-we-created-hitbliss/ [Aug. 12, 2014 1:28:20 PM].

Viggle Inc.; webpage: http://viggleinc.com/overview/; p. 3; date unknown but believed to be before May 15, 2014.

"WildTangent"; Wikipedia webpage; http://en.wikipedia.org/wiki/Wild_Tangent;date unknown but believed to be before May 15, 2014.

E-Miles: How it works; webpage: http://www.e-miles.com/howEmilesWorks.do; date unknown but believed to be before May 15, 2014.

"Cellcom subscribers can now earn free air time for watching ads (Isreal)", Wireless Fereation, dated Sep. 15, 2008; Webpage: http://www.wirelessfederation.com/news/12703-cellcom-subscribers-can-now-earn-free-air-time-for-watching-ads-israel[Aug. 12, 2014 2:26:50 PM].

Vignesh Ramachandran, How Watching Mobile Ads Could Earn You Free Data, Jul. 16, 2013, www.mashable.com, (https://mashable.com/2013/07 /1 6/aquto-free-mobile-data/#4f1 pcMUknsqs).

Monica Hasse, The Web Hostess: Online manners, memes and must-see video, May 30, 2012, The Washington Post (Year:2012).

J. J. Colao, Watch Ads Get Paid Is This the Future of Ad-Supported Content, Mar. 1, 2013, www.Forbes.com (Year: 2013).

Latency and Bandwidth—Brothers from another Mother, May 29, 2020, FlexNetworks (Year: 2020).

* cited by examiner

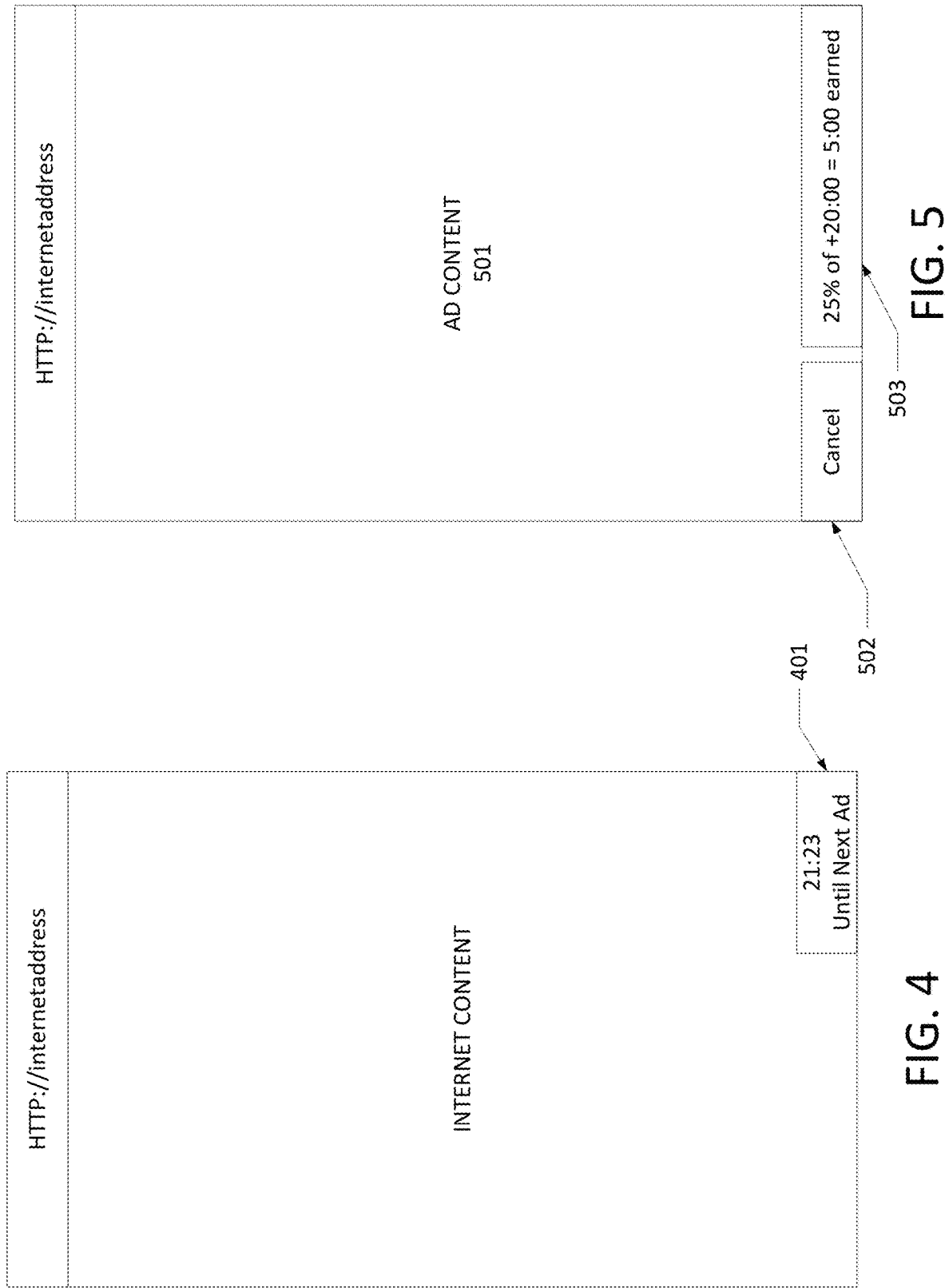

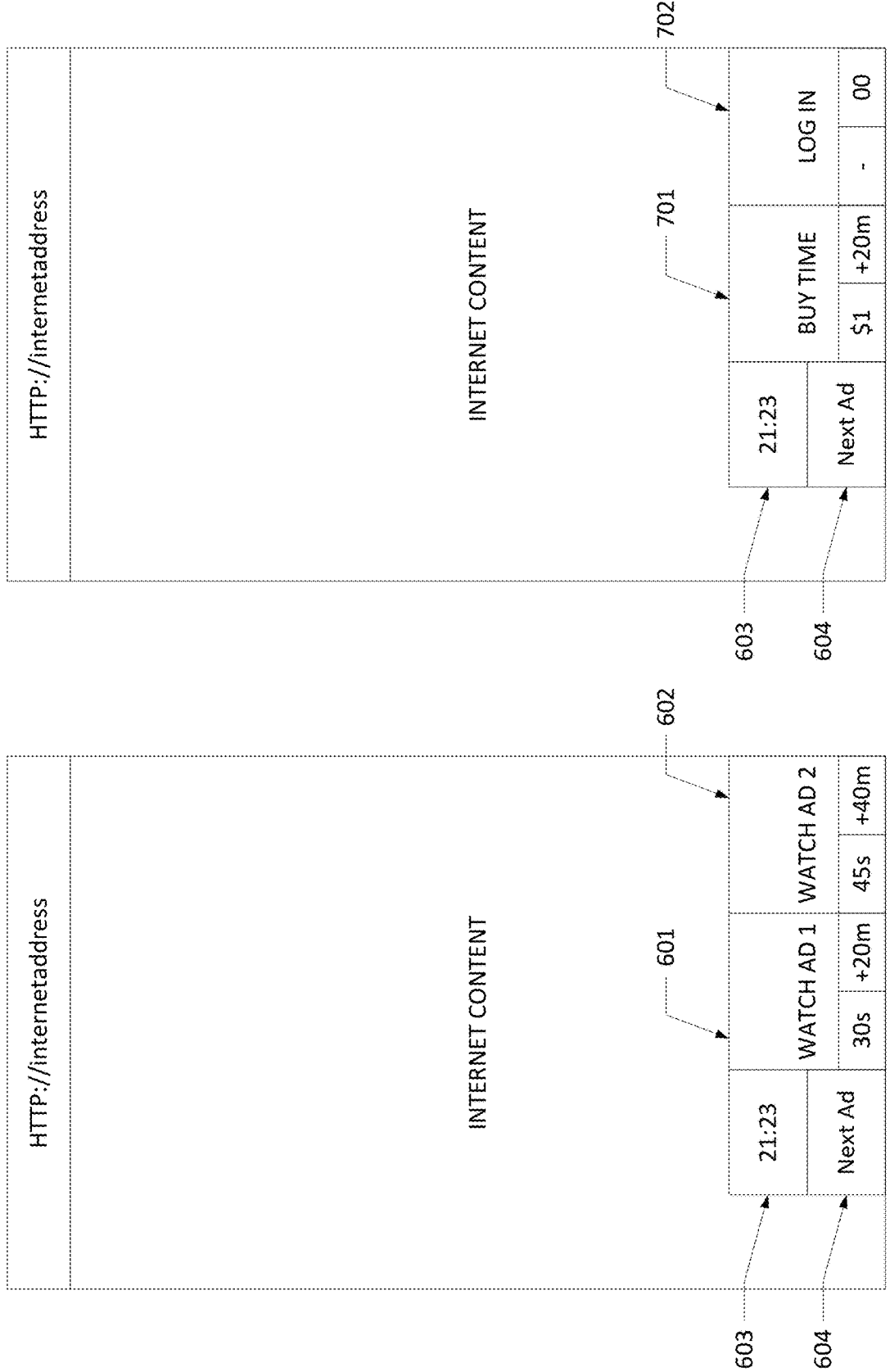

PROVIDING WIRELESS NETWORK ACCESS

CROSS-REFERENCE TO RELATED APPLICATIONS

This application claims priority to and is a continuation of U.S. application Ser. No. 14/278,732, filed May 15, 2014, which is hereby incorporated by reference in its entirety.

BACKGROUND

Access to data networks, such as the Internet, is of critical importance to many.

Wireless network access, in particular, is a convenient mechanism for connecting to data networks, but the cost of deploying and maintaining such a network can discourage operators from deploying wireless access networks in public spaces. There remains an ever-present need to provide greater wireless network access.

SUMMARY

The following summary is for illustrative purposes only, and is not intended to limit or constrain the detailed description.

Embodiments described herein offer ways to encourage user behavior by awarding network access in exchange for certain types of user behavior. In some embodiments, a wireless network may grant access to users (or their devices) on a time-controlled basis. When a user connects to the wireless network, a time counter may begin to measure the user's connection duration, and upon the expiration of a predetermined amount of time, the user's network access may be temporarily interrupted to present an advertisement to the user. Upon completion of viewing the advertisement, the timer counter may reset, and a new amount of network access may be granted to the user.

The user may view an indication of how much time remains before the next interruption, and the user may choose to view one or more advertisements ahead of schedule, to extend the time before the next network interruption. The user may see a listing of available advertisements, and the listing may indicate a duration of the advertisement, and an amount of network access time that will be granted in exchange for the user viewing the advertisement. The user may select one or more of the listed advertisements for immediate presentation, and the user's network access time may be extended based on the advertisements that the user views.

In some embodiments, the user may earn network access time by simply purchasing the time.

In some embodiments, the user may earn other network resources instead of (or in addition to) access time. For example, the user may earn network access bandwidth (e.g., total bandwidth consumption, sometimes referred to as "tonnage"), speed, latency, range, access to restricted content, or any other adjustable network quality. As an alternative to receiving network resources, the user may be provided with monetary incentives, such as a monetary credit applicable to the user's bill.

In some embodiments, the user may earn prioritized access to the network resources. For example, data for users who consume more advertisements than others may be treated with higher priority by the network access point. Data for users who consume fewer advertisements may be placed in a queue, and may be delayed in transmission if data for higher priority users needs to be sent. The control of access can also be based on data volume instead of, or in addition to, time. For example, the counter may measure an amount of data transfer (download, upload, or both) during the user's session, and when the measured amount reaches a predetermined level, the user's network access may be temporarily interrupted to present an advertisement to the user, as described above.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4-7 illustrate various screenshots showing features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
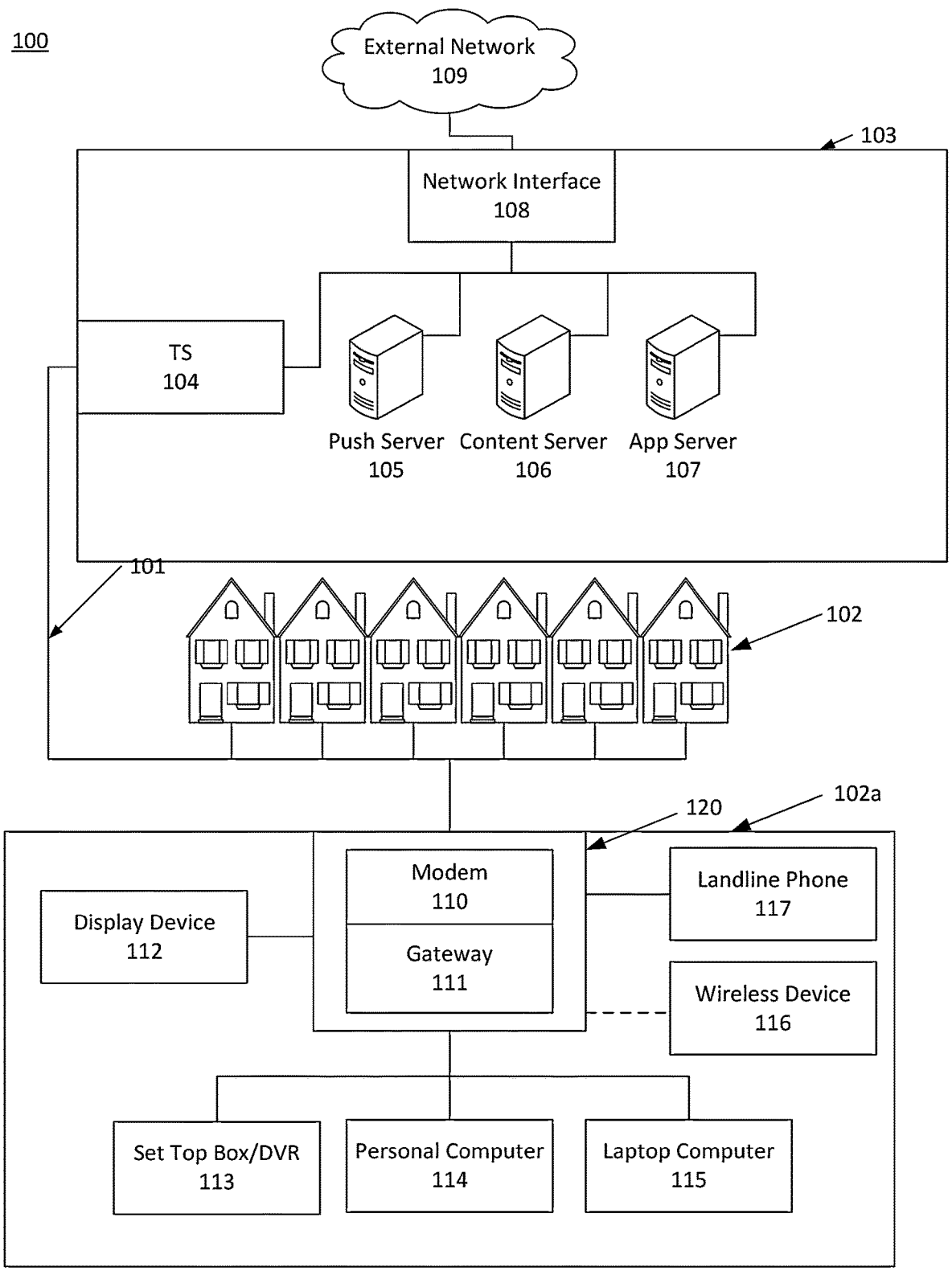
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals. The example premises may be buildings, but other premises may be outdoors. An alternative example premises 102 may be an outdoor vicinity of a wireless communication tower.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., Wi-Fi, WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits (as well as preferences and demographics information) and collecting that information for use in selecting advertisements (or other sponsored content) to offer to the user. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem (s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
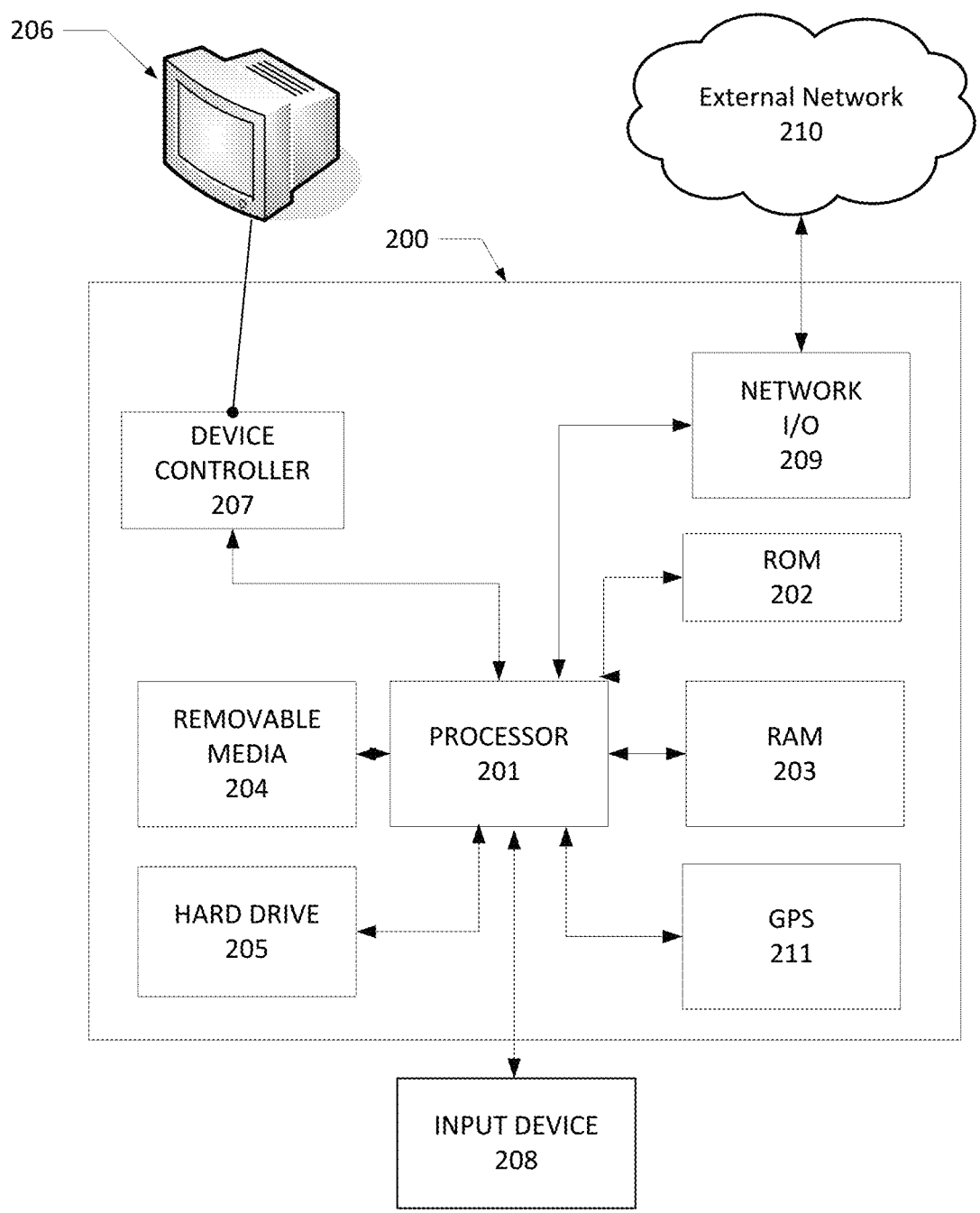
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with a network 210. The network input/output circuit 209 may be a wired interface, wireless interface, or a combination of the two. In some embodiments, the network input/output circuit 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
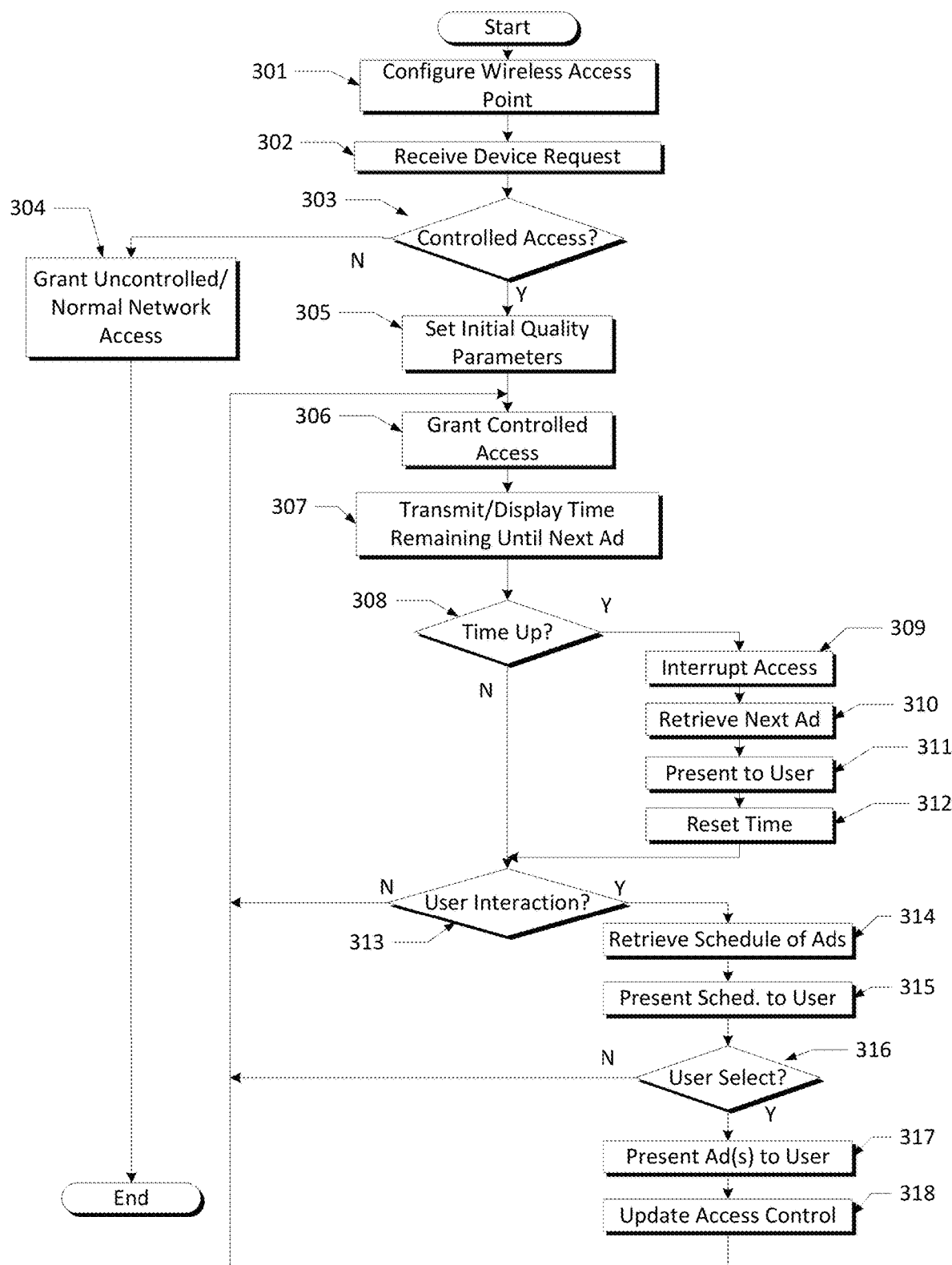
FIG. 3 illustrates an example process for providing content to users.

FIG. 3 illustrates an example process of granting network access to users (or their devices, referred to collectively herein as users). The steps depicted may be performed by a wireless network access device, such as a wi-fi (wireless fidelity) access computing device (e.g., a "wi-fi hotspot") embodied as gateway 111 or interface computing device 120, or any other network access controlling device. Also, although wi-fi wireless network access is used as an example herein, the various concepts described herein may be used to control access to any other wireless (e.g., cellular, local wireless, WiMax, etc.) or wired networks as well.

In step 301, the network access computing device, such as a wireless network access point, may be configured for operation. This configuration may include a network administrator setting wireless network parameters such as the network identifier, security password, etc., as well as other parameters for controlling a user's network access. These other parameters may include, for example, a schedule of advertisements that are to be presented to users who are connected to the network. The schedule may be stored in a memory of the wireless network access point, and may include information identifying the advertisement (e.g., an address, such as an Internet address, where an advertisement video may be found), the advertisement's duration, and information identifying network access rewards that are to be granted to users who consume the corresponding advertisement. The rewards may be, for example, a predetermined amount of time of network access (e.g., a user earns 20 minutes of wireless network access for consuming a first advertisement), or a predetermined adjustment to a network access quality, such as an increase in bandwidth (e.g., a user earns an additional 0.2 MB/s download speed for consuming a first advertisement), or a data amount (e.g., a user earns an additional 100 Mb of data download or upload for consuming a first advertisement).

The rewards may also include access to restricted content. For example, a new movie or video program may be awarded to users who consume a predetermined number (e.g., 10) of advertisements. The rewards may also be monetary, in which case a user may receive a billing credit (e.g., $0.02) as a reward for viewing certain content. Accordingly, the parameters may identify rewards and the criteria needed for a user to obtain the rewards.

The criteria for receiving a reward may also vary. In addition to, or instead of, viewing an advertisement to receive a reward, some rewards may require that the user also pay money, spend loyalty points, airline miles, search tool credits, or other credits earned by the user.

After the access point is configured, the access point may begin to announce its wireless network availability, and may begin to field requests for network access from devices in the access point's wireless transmission range. In step 302, a user may enter the range of an access point, and the user's smartphone may detect the announcement and transmit a request to join the wireless network. The request (or ensuing communications with the network access point) may include information identifying the user, the user's smartphone, the user's account with a network provider (e.g., a cell telephone number, an Internet service provider account, etc.), a password for the access point, user profile preferences, and any other desired identification information.

In step 303, the access point may use the information in the request to retrieve a user profile of the user who sent the request. The profile may be stored in a memory accessible to the access point, and may identify network access credentials and permissions for the user. For example, if the user has a paid subscription to use the access point, then the user's subscription information may be retrieved, and the access point may determine that the user's paid subscription entitles him/her to unrestricted or uncontrolled use of the access point's wireless network. In one aspect, such uncontrolled access may simply mean that the user does not need to view advertisements to earn access to the wireless network. The access point may determine whether the user is to have controlled or uncontrolled access to the access point's wireless network.

If the user is entitled to uncontrolled access, then the access point may proceed to step 304 and begin to service network requests for the user without any of the advertisement-based earning activity described further below. Alternatively, if the user is not entitled to uncontrolled access, then in step 304, the access point may begin a process of controlling the user's access to the wireless network.

If the user is only entitled to controlled network access, then in step 305, the access point may determine an initial set of quality parameters to control the user's access to the wireless network. The initial set of quality parameters may be a default set stored in the access point's memory, and may identify a predetermined time value, such as twenty (20) minutes. The parameters may also identify other network qualities, such as bandwidth or data download or upload speeds. The access point may then grant controlled access to the user in step 306, and may begin to serve the user's network needs and track the user's use of the network (e.g., monitoring a total duration or amount of data transmitted and/or received of the current network access, monitoring bandwidth or other resources used, etc.).

As part of the controlled usage, in step 307, the access point may transmit for display a time value indicating an amount of time remaining for the user's network access. So, for example, if the user were given an initial amount of 20 minutes, then this time value may be a countdown timer for 20 minutes. FIG. 4 illustrates an example smartphone browser user interface, in which a countdown timer overlay 401 is displayed over Internet content. The overlay 401 need not be persistent, and may appear periodically (e.g., once every 5 minutes, or when the timer nears zero) or upon request by the user (e.g., if the user enters a command or selects an onscreen icon to request to see the countdown timer).

The countdown timer 401 indicates an amount of time remaining for the user's network access. In step 308, the access point may determine whether the time has expired, and if it has, then in step 309, the user's network access will be temporarily interrupted. Interrupting the network access may simply entail ceasing to service data requests made by the user. In some embodiments, data sent by, or to, the user may still be processed by the access point, and may simply be buffered in a memory of the access point, to be delivered after the user renews their network access as described below. For example, if the user's browser had transmitted a request for an Internet site's data, then the Internet site data may still be received and buffered by the access point, to be delivered to the user after the user renews the wireless access. In some embodiments, the user's access to the network may be limited by a total amount of data downloaded and/or uploaded, and the countdown timer 401 may indicate an amount of data transmission that remains available before the next temporary interruption.

In step 310, the access point may then retrieve, or provide access to, the next advertisement to be played to the user, as well as information indicating what the user will receive upon completing viewing of the advertisement. For example, the access point may retrieve a schedule of advertisements, as noted above, which identifies different reward time amounts for different advertisements, and retrieve the next advertisement in the schedule.

In step 311, the access point may deliver, or provide access to, the advertisement to the user. The advertisement may be delivered using the same browser (or other application) that the user was using to access content retrieved over the wireless network. In some embodiments, the access point may determine that that the user's normal Internet usage included requests for a particular application (e.g., an Internet browser), and may use that determination to determine a format in which the advertisement should be delivered. For example, if the user's device is a smartphone, and a significant amount of the Internet requests made by the device to the wireless network access point were for Internet pages for a smartphone browser, then the access point may determine that the advertisements should also be delivered in a format compatible with that smartphone browser. The access point may request, from the source of the next advertisement, an appropriately-formatted version of the advertisement. Other customizations to the advertisement may also be made, based on the user's profile.

FIG. 5 illustrates an example browser interface, having the displayed advertisement 501 (which can be any desired content that the owner of the wireless network wishes to promote). The advertisement 501 may be superimposed on, or displayed instead of, the Internet content that the user had been using (e.g., the user's Internet browsing session). In some embodiments, the timer 401 may be displayed even when the user's browser is no longer in the foreground. For example, if the user opens a different application or minimizes the panel of the Internet browser, the timer 401 may remain onscreen so that the user is still aware of the amount of time remaining before the next interruption.

The display of the advertisement 501 may be accompanied by a cancel button 502 that, upon selection, allows the user to terminate viewing the advertisement 501 before the advertisement has reached its normal ending. As noted above, a premature cancellation may still offer the user a partial reward. In the FIG. 5 example, a progress indicator 503 can dynamically indicate the user's progress through the advertisement (e.g., a percentage of the duration of the advertisement, the playback progress, etc.), as well as the amount of the reward earned thus far. The progress indicator 503 may dynamically update as the advertisement is played.

In step 312, after the advertisement is consumed by the user (e.g., viewed by the user), then the access point may reset the countdown timer for the user, and resume controlled network access. The resumption may include, for example, delivering incoming and outgoing data that had been buffered by the access point on behalf of the user, and restoring the user's Internet (or other network) browsing session to its state prior to the interruption.

In step 313, the access point may determine whether the user has chosen to interact with the countdown timer 401. This may occur, for example, if the user chooses to consume advertisements before the timer reaches zero, in order to accumulate time credit to allow a longer period of uninterrupted access. For example, if the user knows he/she is about to begin a stream for a 40-minute television program, and the user does not wish to interrupt the viewing of the program, then the user may choose to voluntarily consume several advertisements to accumulate 40 minutes of network access, thereby allowing uninterrupted access for the duration of the program.

The user may interact with the countdown timer 401 by clicking on it or tapping it, or by entering another command or choosing a menu option. If the user has chosen to interact with the countdown timer 401, then in step 314, the access point may retrieve (or provide access to) the schedule of advertisements for the user. Alternatively, the access point may simply retrieve a collection of advertisements, regardless of whether the advertisements had been previously scheduled for presentation to the user. For example, the access point may transmit an advertisement listing request to an advertising content server (e.g., content server 106), and may receive in response a listing of available advertisements and their associated information (e.g., address, duration, reward, etc.).

In step 315, the access point may transmit a listing of available advertisements to the user's device for presentation to the user. The listing may appear, for example, as shown in FIG. 6, and in response to the user selecting the timer 401 (e.g., by touching it). As shown, the user may be presented with several advertisement options 601, 602. Each option may identify the advertisement, such as its source (e.g., "Ad from Company A"), and may also provide other information such as the duration of the advertisement (e.g., 30 seconds), reward for consuming the advertisement (e.g., 20 minutes added network time), requirements to consume the advertisement (e.g., audio and video, audio only, etc.), sample image from the advertisement, and any other desired information identifying the advertisement. The rewards may vary among different advertisements. For example, a longer advertisement 602 may yield a greater reward than a shorter advertisement 601. Also depicted in the screenshot are a timer 603 and Next Ad button 604. The timer 603 displays the countdown timer information 401, and the Next Ad button 604 is a graphical button that, when selected, allows the user to immediately see a next advertisement in a sequence of advertisements. Alternatively, the Next Ad button 604 may allow the user to scroll through a listing of available advertisements, such as causing the advertisement options 601 and 602 to move left and right, displaying new advertisement options.

In step 316, the access point may determine whether the user has selected any of the offered advertisements. This determination may be based on, for example, the user's device receiving a user selection (e.g., a user touching one of the listings) and reporting it to the access point. If the user has selected an advertisement, then in step 317 the access point may retrieve (if not already done so) the selected advertisement's audio and/or video file(s), and transmit the advertisement content to the user's device.

In step 318, after the user has completed viewing the advertisement, the access point may then update its stored information regarding the user's network access rights. For example, the access point may increase the timer countdown 401 value by the reward amount for the advertisement. In this way, the access point may store an account balance of access time for the user, and update it as time passes and as the user consumes advertisements. In some embodiments, the user may be given the option of canceling the presentation of the advertisement (e.g., by selecting a "Cancel" button displayed with the advertisement) before the advertisement has completed its presentation. If the user cancels an advertisement before the advertisement is fully presented, then the reward may be partially earned based on the partial viewing (e.g., granting a proportion of the access time reward that is commensurate with the proportion of the advertisement that the user viewed before canceling), or in some embodiments the reward may be null (e.g., if the advertisement requires the user to view the advertisement until completion in order to earn any reward).

Other access right changes that may be granted in a reward may include changing the network bandwidth usage (or tonnage), the transmission speed (e.g., 50 Mb/s), latency (e.g., guaranteeing a 50 ms response time), granting access to restricted content (e.g., allowing the user to view a pay-per-view movie or video on demand), or any other adjustable network quality. Alternatively, or additionally, the user may be rewarded with monetary incentives. The user may receive a monetary credit applicable to the user's next invoice (e.g., $0.02 credit to the user's account), or which the user may further use in trade to obtain other goods and services.

After updating the user's access rights, the access point may return to step 306 and continue granting access to the user. Similarly, in steps 313 and 316, the process may also return to step 306 if the user has not elected to interact with the countdown timer 401 (step 313) or selected an advertisement from the schedule (step 316).

In some embodiments, the reward for an advertisement may be something other than network access time. For example, the reward may be a temporary increase in bandwidth or data transmission speed for the user (e.g., increased 0.2 MB/s for 20 minutes), or an increase to an allotment of a total amount of data upload or download (e.g., an additional 100 MB of download data). These other types of rewards may also be granted in step 318, and the user's profile information with the access point may be updated to reflect the change.

In the example above, the user obtained rewards by consuming advertisements. In alternative embodiments, the user may obtain rewards by performing other actions, such as by purchasing the rewards. FIG. 7 illustrates an example interface in which, instead of displaying available advertisements, the access point (via the user's device) may offer options to simply purchase additional time or to skip the next advertisement 701, or to log in to a predetermined subscription account that permits uncontrolled network access. The FIG. 7 interface may be presented in response to a user interaction, such as step 313, and may have similar steps to steps 314-318, but with the different user action.

As noted above, there may be various types of rewards for the user, aside from time of access and the bandwidth/data limit examples given above. For example, the user may be granted access to a restricted piece of content if the user consumes a predetermined number (e.g., 10) of advertisements. In such an embodiment, the access point may simply track the number of times the user performs the required action (e.g., consumes an advertisement), and when the user satisfies the reward criteria, the access point may notify a content server 106 to grant the user access to the restricted content. The content server 106 may then provide the access point, and ultimately the user, with a password or other credentials to authorize access to the restricted content.

Another example reward may be priority access to the access point's resources. The access point may track a number of advertisements that the user has consumed, and compare that number with the number of advertisements that other users have consumed. The access point may rank its users according to the number of advertisements the user have consumed, and higher-ranked users may receive preferential access to the access point's resources. This preferential treatment may include, for example, treating data requests from high priority users before treating requests from low priority users; allocating more buffer resources for high priority users than low priority users; and any other desired form of preferential treatment. Granting higher priority to a user may have the result of reducing latency in the user's requests.

In some embodiments, the user may be permitted to trade his/her network access privileges with other users. For example, users may trade network access time for bandwidth, or trade network access privileges for any other consideration that another user is willing to give.

In some embodiments, the countdown timer 401 may give the user the option of immediately viewing the next advertisement in the schedule. This may be useful, for example, if the user wishes to accumulate uninterrupted network access time, such as to watch the 40-minute television program discussed above.

In the examples above, the countdown timer 401 depicts an amount of time remaining before the next advertisement. In alternative embodiments, the countdown 401 may be measured in other units, such as bandwidth usage (e.g., 2 Mb). In such alternative embodiments, the countdown 401 may indicate that the user will need to view an advertisement after the user sends and/or receives the remaining amount of bandwidth (e.g., 2 Mb of remaining bandwidth available, and after the user downloads 2 Mb of data, the user will be taken to view an advertisement to earn additional bandwidth).

In the examples above, the user may be using an Internet browser to surf the Internet, and the reward for viewing an advertisement may be additional time (or bandwidth) to be used while surfing on the browser. In some alternative embodiments, the earned time (or bandwidth) need not be consumed by the Internet browser, and may instead be used by a different application on the user's device. For example, the user may initially use a browser application on a tablet computer to surf the Internet using a public wi-fi hotspot, and may earn additional network access time by viewing ads, but the additional network access time may be used by a different application (e.g., a game) on the user's tablet. In such an embodiment, the granting of controlled access 306 may include granting the access for other applications (or specify individual applications that are permitted to use the granted access), and in step 309 the user may be prompted to return to the Internet browser when it is time to earn more access time or resources by viewing advertising or other sponsored content.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   granting, by a network access device, to a user device, and based on a request to access a wireless network, access to the wireless network;
   sending, to the user device, a parameter for accessing the wireless network, the parameter identifying at least one content item, the parameter comprising:
   information identifying a network access reward associated with the at least one content item;
   receiving, from the user device, a selection of the at least one content item; and
   updating, by the network access device and based on the information identifying the network access reward, network access rights for the user device.

2. The method of claim 1, further comprising increasing, based on the information, a data amount for a connection between the network access device and the user device.

3. The method of claim 1, further comprising granting different levels of wireless network access quality to different user devices based on past content item presentations by the different user devices.

4. The method of claim 1, further comprising increasing, based on a bandwidth associated with the at least one content item, bandwidth for the network access rights to access the wireless network.

5. The method of claim 1, further comprising:
   ranking the user device in relation to a second user device based on the at least one content item, and
   granting preferential treatment to one of the user device or the second user device based on the ranking.

6. The method of claim 1, further comprising:
   determining a format for the at least one content item based on a network usage history of the user device; and
   sending, to the user device, the at least one content item in the determined format.

7. The method of claim 1, further comprising causing output, by the user device, of a user interface, the user interface comprising an indication of a network access status and a description of a bandwidth associated with the at least one content item.

8. The method of claim 1, further comprising determining an update to a display of network access status based on a bandwidth associated with the at least one content item.

9. The method of claim 1, further comprising causing output of a progress bar that indicates a progress of the user device through the at least one content item.

10. The method of claim 1, wherein a portion of a bandwidth associated with the at least one content item is determined based on an indication that playback of the at least one content item was stopped before an end of the at least one content item was reached.

11. The method of claim 1, further comprising:
    determining, by the network access device and based on a user profile associated with the user device, the parameter; and
    updating, based on a bandwidth associated with the at least one content item, the parameter.

12. A non-transitory computer-readable medium storing instructions that, when executed, cause:
    granting, based on a request to access a wireless network and to a user device, access to a wireless network;
    sending, to the user device, a parameter for accessing the wireless network, the parameter identifying at least one content item, the parameter comprising:
    information identifying a network access reward associated with the at least one content item;
    receiving, from the user device, a selection of the at least one content item; and
    updating, based on the information identifying the network access reward, network access rights for the user device.

13. The non-transitory computer-readable medium of claim 12, wherein the instructions, when executed, cause:
    increasing, based on the information, a data amount for a connection between a network access device and the user device.

14. The non-transitory computer-readable medium of claim 12, wherein the instructions, when executed, cause:
    granting different levels of wireless network access quality to different user devices based on past content item presentations by the different user devices.

15. The non-transitory computer-readable medium of claim 12, wherein the instructions, when executed, cause:

increasing, based on a bandwidth associated with the at least one content item, bandwidth for the network access rights to access the wireless network.

16. The non-transitory computer-readable medium of claim 12, wherein the instructions, when executed, cause:
ranking the user device in relation to a second user device based on the at least one content item, and
granting preferential treatment to one of the user device or the second user device based on the ranking.

17. The non-transitory computer-readable medium of claim 12, wherein the instructions, when executed, cause:
determining a format for the at least one content item based on a network usage history of the user device; and
sending, to the user device, the at least one content item in the determined format.

18. The non-transitory computer-readable medium of claim 12, wherein the instructions, when executed, cause:
causing output, by the user device, of a user interface, the user interface comprising an indication of a network access status and a description of a bandwidth associated with the at least one content item.

19. The non-transitory computer-readable medium of claim 12, wherein the instructions, when executed, cause:
determining an update to a display of network access status based on a bandwidth associated with the at least one content item.

20. The non-transitory computer-readable medium of claim 12, wherein the instructions, when executed, cause:
causing output of a progress bar that indicates a progress of the user device through the at least one content item.

21. The non-transitory computer-readable medium of claim 12, wherein a portion of a bandwidth associated with the at least one content item is determined based on an indication that playback of the at least one content item was stopped before an end of the at least one content item was reached.

22. The non-transitory computer-readable medium of claim 12, wherein the instructions, when executed, cause:
determining, based on a user profile associated with the user device, the parameter; and
updating, based on a bandwidth associated with the at least one content item, the parameter.

23. A system comprising:
a network access device; and
a user device,
wherein the network access device is configured to:
grant, based on a request to access a wireless network and to the user device, access to the wireless network;
send, to the user device, a parameter for accessing the wireless network, the parameter identifying at least one content item, the parameter comprising:
information identifying a network access reward associated with the at least one content item;
receive, from the user device, a selection of the at least one content item; and
update, based on the information identifying the network access reward, network access rights for the user device; and
wherein the user device is configured to:
receive, from the network access device, the parameter for accessing the wireless network; and
send, to the network access device, the selection of the at least one content item.

24. The system of claim 23, wherein the network access device is further configured to increase, based on the information, a data amount for a connection between the network access device and the user device.

25. The system of claim 23, wherein the network access device is further configured to grant different levels of wireless network access quality to different user devices based on past content item presentations by the different user devices.

26. The system of claim 23, wherein the network access device is further configured to increase, based on a bandwidth associated with the at least one content item, bandwidth for the network access rights to access the wireless network.

27. The system of claim 23, wherein the network access device is further configured to:
rank the user device in relation to a second user device based on the at least one content item, and
grant preferential treatment to one of the user device or the second user device based on the rank.

28. The system of claim 23, wherein the network access device is further configured to:
determine a format for the at least one content item based on a network usage history of the user device; and
send, to the user device, the at least one content item in the determined format.

29. The system of claim 23, wherein the network access device is further configured to cause output, by the user device, of a user interface, the user interface comprising an indication of a network access status and a description of a bandwidth associated with the at least one content item.

30. The system of claim 23, wherein the network access device is further configured to determine an update to a display of network access status based on a bandwidth associated with the at least one content item.

* * * * *